United States Patent [19]

Tromborg

[11] Patent Number: 4,464,756
[45] Date of Patent: Aug. 7, 1984

[54] SYSTEM FOR ERROR DETECTION IN FREQUENCY SHIFT KEYED SIGNALS

[75] Inventor: Erik T. Tromborg, Bloomington, Minn.

[73] Assignee: Honeywell Inc., Minneapolis, Minn.

[21] Appl. No.: 582,869

[22] Filed: Feb. 27, 1984

Related U.S. Application Data

[63] Continuation of Ser. No. 306,278, Sep. 28, 1981, abandoned.

[51] Int. Cl.³ .............................................. G06F 11/08
[52] U.S. Cl. ........................................ 371/63; 375/91; 375/99
[58] Field of Search .............. 371/55, 63, 68; 375/51, 375/91, 99, 102

[56] References Cited

U.S. PATENT DOCUMENTS

| | | | |
|---|---|---|---|
| 2,900,447 | 8/1959 | Hennig | 371/63 |
| 2,929,049 | 3/1960 | Lubkin | 371/63 |
| 3,166,737 | 1/1965 | Sparacio | 371/63 |
| 3,348,153 | 10/1967 | Featherston | 375/82 |
| 3,349,371 | 10/1967 | Brothman et al. | 371/6 |
| 3,551,889 | 12/1970 | Miller | 375/91 |
| 3,634,665 | 1/1972 | Carter et al. | 371/63 |
| 3,636,257 | 1/1972 | Dixon | 375/45 |
| 3,869,669 | 3/1975 | Eldert et al. | 371/45 |
| 3,992,698 | 11/1976 | Sahasrabudhe et al. | 371/68 |

OTHER PUBLICATIONS

Sellers, Jr. et al., Error Detecting Logic for Digital Computers, McGraw-Hill, New York, 1968, pp. 227, 143–149.

Wakerly, Error Detecting Codes, Self-Checking Circuits and Applications, North-Holland, New York, pp. 65–71.

Primary Examiner—Charles E. Atkinson
Attorney, Agent, or Firm—Charles G. Mersereau

[57] ABSTRACT

An improved binary signal discrimination system for demodulating FSK transmitted signals is disclosed which requires that both the mark or binary "1" signal frequency and the complementary of the space or binary "0" frequency be present for a mark signal to be recognized; and, conversely requires that both the space signal frequency and the complement of the mark signal frequency be present for a space signal to be recognized.

4 Claims, 2 Drawing Figures

SYSTEM FOR ERROR DETECTION IN FREQUENCY SHIFT KEYED SIGNALS

This application is a continuation of application Ser. No. 306,278, filed Sept. 28, 1981, now abandoned.

BACKGROUND OF THE INVENTION

1. Field of the Invention

The present invention relates generally to communication systems and, more particularly, to a simplified system of detecting and reducing errors in processing binary frequency shift keyed signals.

2. Description of the Prior Art

Many communication systems use digital modulation techniques in signal transmission. One such digital transmission technique involves frequency shift keyed (FSK) modulation. Frequency shift keying involves the modulation of a base or carrier frequency to shift its frequency by predetermined increments in response to particular data to be transmitted.

In a frequency modulated (FM) system, the frequency shift phase is continuous, i.e. the transmitted signal is a sinusoidal signal which varies in frequency but has no time phase shift continuity. In a binary FSK system normally, a binary "1" or "mark" signal is transmitted at a frequency above a selected center frequency and is known as a "carrier plus" frequency. A binary "0" or "space" is transmitted at a frequency below the center frequency of the carrier or a "carrier minus" frequency.

Systems for producing frequency shift keyed transmission signals are well known. In such systems, the differential between the transmitted frequency and the center frequency of the carrier is normally made equal to or slightly greater than the modulation rate required, or data rate required, divided by two. Because these signals are normally fairly close together in frequency and because spurious signals or noise signals are usually received from time to time, it is necessary for any receiving unit to accurately discriminate between the mark and space frequencies and between either of these and other noise signals so that proper discrimination in reception and use of the signal can be made.

In the prior art many schemes have been suggested in an attempt to assure that correct identification of mark and space signals occur in binary FSK receiver systems. One such prior art receiver system is illustrated and described in U.S. Pat. No. 3,348,153, issued Oct. 17, 1967. That patent illustrates and describes a system which uses a binary logic scheme which assumes the reception of a binary "1" or mark signal if either of two events occur. One such event is the detection of the presence of a mark signal and the other is the detection of the complement or absence of a space signal. Conversely, the detection of the presence of a space signal or the detection of the complement of a mark signal will be taken as a space signal. After the signals have traversed other gates, the determination is finally made by two OR gates which feed signals to a flip-flop or output device which changes state accordingly. Compensation is made for the presence or absence of both signals simultaneously such that the flip-flop is not triggered. The flip-flop or output device, thus, may be triggered although the necessary FSK system frequency may be entirely missing in the reference input signal.

SUMMARY OF THE INVENTION

By means of the present invention there is provided an improved FSK signal receiving system which uses a simplified binary logic scheme to differentiate both between mark and space signals and to eliminate noise. The system of the present invention requires that not only must the desired mark or space signal be present in order to trigger the corresponding state in an output device, the complement of the other space or mark signal must also be present. This is accomplished with fewer gates and logic components in the system than with prior devices.

In the preferred embodiment, incoming signals are filtered, amplified and separated into appropriate mark and space channels in conventional fashion. The mark and space channels are connected with one input of separate AND gates and the input of an inverter or NOT gate. These are combined such that the mark signal and the complement or NOT of the space signal become the input to one AND gate. The presence of both conditions produces a binary "1" or mark output signal from the AND gate. Conversely, the second AND gate has inputs from the space channel and the NOT of the mark channel. If both of these conditions are satisfied, a binary "0" or space output is produced. Another AND gate detects the presence of both a mark and a space frequency signal as noise and still another AND gate detects the absence of both the mark and space signals which condition is identified as a "no signal" condition. In this manner, the preferred embodiment of the present invention needs but a combination of two NOT and four AND gates to accomplish the foregoing results. The signal output may be applied to a bistable element or other signal utilization means in a well-known manner.

BRIEF DESCRIPTION OF THE DRAWINGS

In the drawings wherein like numerals are utilized to depict like parts throughout the same.

DESCRIPTION OF THE PREFERRED EMBODIMENT

Figure 1:
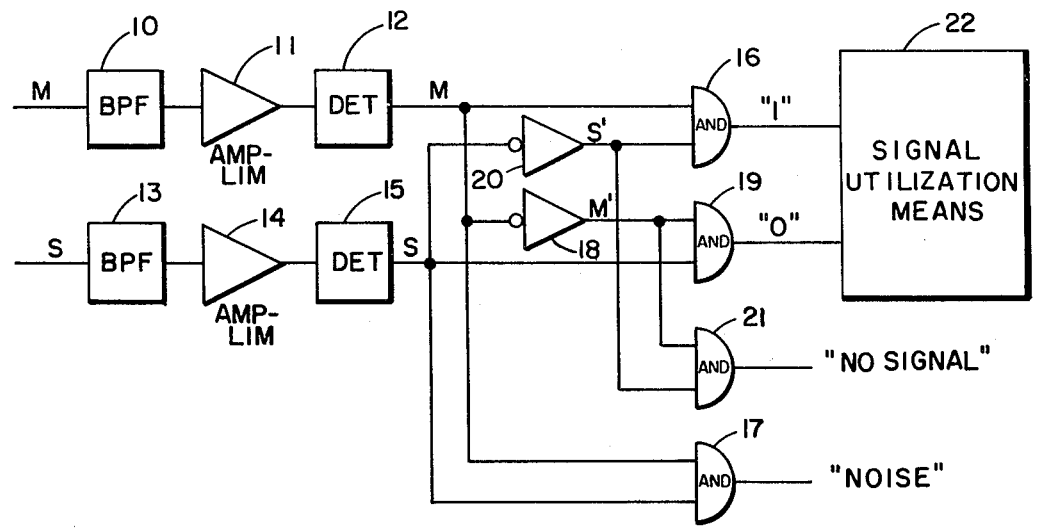
FIG. 1 is a simplified schematic diagram of an FSK binary communications receiver embodying the present invention.

FIG. 1 is a simplified schematic block diagram of the FSK binary communications receiver embodying the present invention. Thus, there is shown at 10 a bandpass filter tuned to pass the "M" or mark frequency connected to a typical amplifier 11 and detector 12. In similar fashion the space frequency or frequency "S" is processed by a bandpass filter 13, amplifier 14 and detector 15. Signals from the mark channel are fed via appropriate conductors to the input of AND gates 16 and 17 and the input of inverter or NOT gate 18. The signal from the space channel is fed by appropriate conductors to AND gates 17 and 19 and inverter 20. The output of inverter 18 is connected with the input of AND gate 19 and AND gate 21. The output of inverter 20 is connected to one side of AND gate 16 and AND gate 21.

Figure 2:
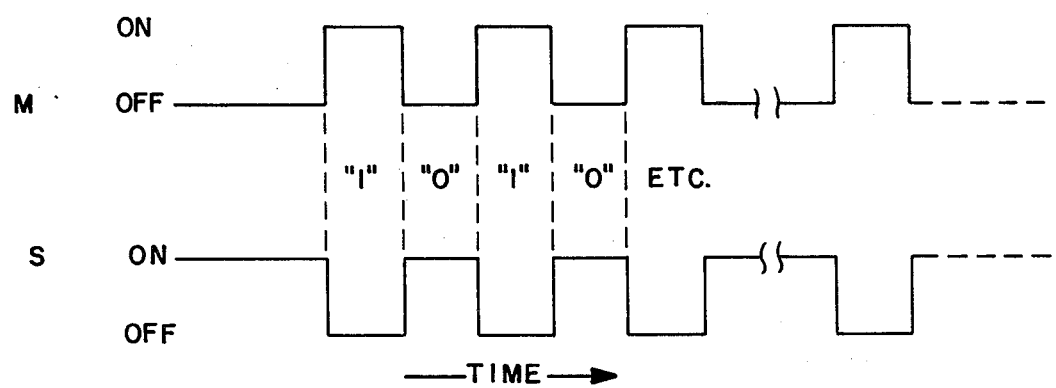
FIG. 2 is a typical timing diagram in accordance with the receiver of FIG. 1.

From this and the timing diagram of FIG. 2, it can readily be seen that in order for a binary "1" or mark signal to be transmitted to the signal utilization means 22 it is necessary for both the mark signal and the complement of the space signal to be present. In the case of the transmission of a binary "0" not only must the space frequency be present, but also the complement of the mark signal must be present. If neither signal is detected there will be an output from AND gate 21 indicating no signal and if both signals are detected by the system there will be an output from gate 17 indicating noise. If there is an output from either AND gate 17 or AND gate 21, it is detected as error and the status of the signal utilization means of the system remains unchanged and unaffected by the incoming signals.

The scheme of the present invention offers advantages over detection and decoding methods in the systems which rely on the presence of only one signal and not the complement of the other. This provides an additional precaution against activation by noise or other spurious signals or problems associated with FSK signal transmission. It also eliminates erroneous operation associated with large amplitude pulses which might occur in either the mark or space frequency bands which would ordinarily be detected and result in ambiguous or erroneous binary determinations.

In addition to adding the additional factor requiring the presence of the second condition, the FSK binary communication receiver of the present invention accomplishes this improvement utilizing but two inverters and four AND gates which represents a simplification over many prior art circuits.

I claim:

1. In an FSK receiver system having mark and space channels connected to a binary logic decision making system, the improvement comprising an essentially instantaneous validation system for checking the validity of any bit of a message or message unit, said validation system further comprising:
   first circuit means connected to said mark channel responsive to mark signals on said mark channel and having a characteristic output which is the complement of said mark signal;
   second circuit means connected to said space channel responsive to space signals on said space channel and having a characteristic output which is the complement of said space signal;
   first gate means connected to receive simultaneous inputs directly from both said mark channel and the output of said second circuit means, said first gate means adapted to generate a signal responsive only to the presence of both said mark signal and the complement of said space signal;
   second gate means connected to receive simultaneous inputs directly from both said space channel and said first circuit means, said second gate means being adapted to generate a signal responsive only to the presence of both said space signal and the complement of said mark signal; and
   means connecting the output of said first and said second gate means to a signal utilization means.

2. The apparatus of claim 1 further comprising, third gate means connected to receive simultaneous direct inputs from both said mark and said space channels, said third gate means being adapted to generate a signal only in the presence of both said mark and said space signals thereby indicating the presence of noise or false signals.

3. The apparatus according to either of claims 1 or 2 further comprising, fourth gate means connected to receive simultaneous, direct inputs from the outputs of both said first and said second circuit means, said fourth gate means being adapted to generate a signal in response only to the absence of both said mark and said space signals in said channels thereby indicating the absence of a signal.

4. The apparatus of any of claims 1 through 3 wherein said first and second circuit means are inverters and all of said gate means are AND gates.

* * * * *